Feb. 17, 1948.   G. T. SCHMIDLING   2,436,182
PHOSPHORESCENT RESIN COMPOSITION
Filed Nov. 26, 1941
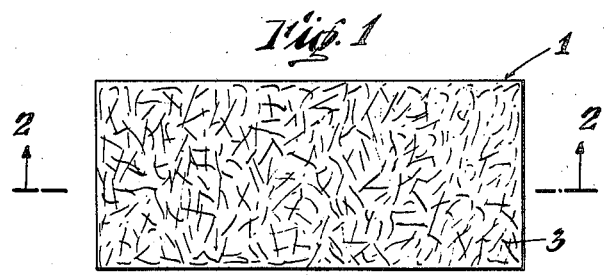
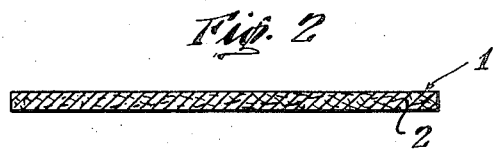
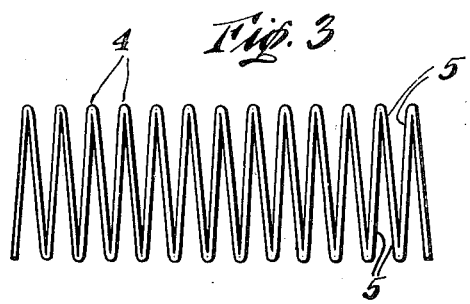
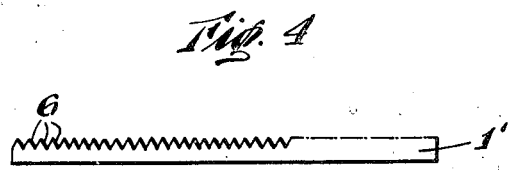
INVENTOR.
Gilbert T. Schmidling
BY
Norman T. Holland
ATTORNEY Patented Feb. 17, 1948

2,436,182

UNITED STATES PATENT OFFICE 2,436,182

PHOSPHORESCENT RESIN COMPOSITION

Gilbert T. Schmidling, New York, N. Y.

Application November 26, 1941, Serial No. 420,534

12 Claims. (Cl. 252—301.3)

The present invention relates generally to means for phosphorescent lighting and more particularly to an improved means containing a phosphorescent material.

The general principle of phosphorescent lighting is the provision of a device adapted to absorb light while exposed to it and to glow or emit light after the energizing light is extinguished. Phosphorescent devices may be used on cars and trucks, in hallways, garages and cellars, on steps, obstructions and the like and for various other purposes. In war time such devices are particularly useful during blackouts since they can be seen at short distances but are not visible at substantial distances; hence they cannot be seen by enemy fliers. Among the problems encountered are the provision of phosphorescent materials and devices which have a sufficiently long and sufficiently intense afterglow, which will resist adequately atmospheric weather conditions, which will withstand rough usage, and which may be readily and inexpensively made.

The present invention aims to provide a phosphorescent device which will overcome or minimize the above and other problems heretofore encountered by providing a more luminous and effective phosphorescent light for longer periods and one capable of withstanding rough usage and exposure to atmospheric conditions.

An object of the present invention is to provide an improved phosphorescent device.

Another object of the invention is to provide a more effective phosphorescent device.

Another object of the invention is to increase the intensity and the period of afterglow of luminescent devices.

Another object of the invention is to provide a phosphorescent device which is more resistant to weather conditions.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a top plan view of one embodiment of the invention;

Fig. 2 is a cross sectional view along the line 2—2 of Fig. 1;

Fig. 3 is a sectional view through another embodiment of the invention; and

Fig. 4 is a sectional view through a third embodiment of the invention.

Referring again to the drawings and more particularly to Figs. 1 and 2 thereof, there is shown a sheet 1 of transparent or translucent material having a phosphorescent material 2 embodied therein. I have found that by adding a phosphorescent material to a resin of the methacrylate type while in the monomer state, the phosphorescent material will retain substantially its original strength and effectiveness without impairment. Thus an improved device is provided. In the preferred embodiment I prefer to add the following to a plastic or resin of the methacrylic type, for example, methyl methacrylate or n-butyl methacrylate: About ten per cent (10%) by weight of a phosphorescent material such as strontium sulphide, about three per cent (3%) by weight of a stabilizer such as aluminum stearate, calcium borate, aluminum borate or glycerol monostearate, and about five per cent (5%) by weight of a plasticizer such as dibutyl phthalate or tri-cresyl phosphate. The above or their equivalents should be added while the plastic is in the monomer or liquid state. The plastic is then polymerized and formed into a sheet of about one-eighth of an inch thick.

For best efficiency the amount of phosphorescent material should be varied with the thickness of the material to be formed. Contrary to expectations, I have found that the amount of phosphorescent material added should be based on the surface area of the effective side of the device rather than on the volume or weight of the device. For example, the same amount of phosphorescent material may be embodied in a sheet with a given area whether the sheet be one-eighth of an inch (⅛"), one-quarter of an inch (¼"), one-half an inch (½"), or some other dimension in thickness. Apparently, the reason for this phenomenon is that a given number of phosphorescent particles per square inch are sufficient. The particles seem to be equally effective regardless of thickness. Therefore if the finished material is relatively thick a smaller percentage by weight of the phosphorescent material is required to obtain the desired result.

While better results are obtained by using a stabilizer and a plasticizer, partial results can be obtained if one or both of these are omitted.

The preferred embodiment preferably includes, in addition, a dye or coloring matter which prevents passage of light waves longer than the light waves emitted by the phosphorescent material. This permits effective energization of the phosphorescent material and full emission of phosphorescent light. At the same time the coloring protects the phosphorescent material against the longer light waves such as those of red light which quench the phosphorescent material. In this manner the efficiency of the phosphorescent material and the period of afterglow are greatly increased. A blue green dye or coloring material is very effective for this purpose.

The effectiveness of the device may be further increased by crazing the surface of the material as shown at 3 in Fig. 1. This may be done by applying acetone or a similar solution to form a series of small cracks and crevices. The re-entrant angles formed by the sides of the cracks and crevices permit the phosphorescent particles from adjoining sides of the crevices to excite each other repeatedly thereby increasing the intensity of the light given off and also the period of the afterglow.

A similar result may be obtained by forming corrugations 4 in the sheet as shown in Fig. 3. The adjacent sides 5 of the corrugations may be very close to each other as the material is transparent or translucent and, hence, the light will pass through the material to energize the phosphorescent material while it is exposed to light. A further modification is shown in Fig. 4 where the surface of the sheet 1' is grooved as shown at 6. The results are similar to those described above. The surfaces of the sheets in Figs. 3 and 4 may be treated with acetone if desired.

In making the device the phosphorescent material is added to a plastic of the methacrylic type while the plastic is in the monomer state. At the same time a plasticizer, a stabilizer and a coloring material may be added. Thereafter the compound is polymerized and formed into a phosphorescent sheet which may be the flat or corrugated type. The surface of the sheet is then crazed by applying acetone or the like. The corrugations and the cracks formed by the acetone increase the effectiveness and the efficiency of the device.

It will be seen that the present invention provides a more effective phosphorescent device which will glow with greater intensity and for a longer period than existing devices. The phosphorescent material, being embedded in the transparent or translucent plastic, is protected against moisture and atmospheric conditions. Hence, the life of the device is greatly increased. The coloring material protects the phosphorescent particles from relatively long light waves which tend to quench them and permits energization by passing the relatively short light waves which are effective for that purpose. The device is rugged in construction and fully capable of withstanding the rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A phosphorescent device comprising a resin of the methacrylic type having a substantially blue green coloring matter added thereto and also having a phosphorescent material embedded therein.

2. A phosphorescent device comprising a resin adapted to pass light having a phosphorescent material embedded therein and also having a coloring material therein adapted to retard the passage of light rays having a longer wave length than the wave length of the rays emitted by said phosphorescent material and adapted to permit the passage of light rays having a shorter wave length.

3. A phosphorescent device comprising a resin of the methacrylic type having a phosphorescent material embedded therein and also having a coloring material therein adapted to retard the passage of light rays having a longer wave length than the wave length of the rays emitted by said phosphorescent material and adapted to permit the passage of light rays having a wave length shorter than the rays emitted by said phosphorescent material.

4. A phosphorescent device comprising a resin of the methacrylic type having phosphorescent material embedded therein, said resin having a crazed surface.

5. A phosphorescent device comprising a polymerized resin of the methacrylic type having therein a phosphorescent material, strontium sulfide, a stabilizer, aluminum stearate in the proportion of about three per cent, and a plasticizer, dibutyl phthalate in the proportion of about five per cent, said materials being added to the resin while the resin is in its monomer state.

6. A phosphorescent device comprising a resin of the methacrylic type having therein a phosphorescent material strontium sulphide, a stabilizer, aluminum stearate in the proportion of about three per cent, and a plasticizer, dibutyl phthalate in the proportion of about five per cent.

7. The method of making a phosphorescent device which method comprises adding a phosphorescent material and blue green coloring material to a resin of the methacrylic group, while the resin is in the monomeric state, and thereafter polymerizing the resin.

8. The method of making a phosphorescent device which method comprises adding a phosphorescent material, blue green coloring material, a stabilizer and a plasticizer to a resin of the methacrylic group while in the monomeric state and thereafter polymerizing the resin.

9. A phosphorescent device comprising a resin of the methacrylic type carrying about ten percent of strontium sulphide, about three percent of a stabilizer selected from the group consisting of aluminum stearate, calcium borate, aluminum borate and glycerol monostearate, about five percent of a plasticizer selected from the group consisting of dibutyl phthalate and tri-cresyl phosphate, and also carrying a blue-green dye.

10. The method of making a phosphorescent device which comprises adding to a resin of the methacrylic group while in the monomeric state about ten percent of strontium sulphide, about three percent of a stabilizer selected from the group consisting of aluminum stearate, calcium borate, aluminum borate and glycerol monostearate, about five percent of a plasticizer selected from the group consisting of dibutyl phthalate and tri-cresyl phosphate, and a blue-green dye, and thereafter polymerizing the mixed material.

11. A phosphorescent device having a body comprising resin of the methacrylic type admixed with phosphorescent material, and a surface on said body having numerous re-entrant angles formed therein to increase the phosphorescence thereof by returning part of the light to the body.

12. A phosphorescent device having a body comprising resin of the methacrylic type admixed with a phosphorescent sulphide material and a less quantity of a stabilizer, and a grooved surface on said body to increase the phosphorescence of said body.

GILBERT T. SCHMIDLING.

REFERENCES CITED

The following references are of record in the file of this patent:

UNITED STATES PATENTS

| Number | Name | Date |
| --- | --- | --- |
| 248,413 | Drummond | Oct. 18, 1881 |
| 868,779 | Hammer | Oct. 22, 1907 |
| 1,244,058 | Langner | Oct. 23, 1917 |
| 1,467,132 | Bilstein | Sept. 4, 1923 |
| 1,506,729 | Stewart | Aug. 6, 1924 |
| 1,606,397 | Bond | Nov. 9, 1926 |
| 2,056,793 | Macht | Oct. 6, 1936 |
| 2,084,526 | Grenier | June 22, 1937 |
| 2,113,090 | McKeag | Apr. 5, 1938 |
| 2,129,478 | Rohm | Sept. 6, 1938 |
| 2,136,404 | Wheeler | Nov. 15, 1938 |
| 2,179,134 | Servigne | Nov. 7, 1939 |
| 2,180,508 | Fraine | Nov. 21, 1939 |
| 2,181,305 | Myers | Nov. 28, 1939 |
| 2,219,929 | Kaufman | Oct. 29, 1940 |
| 2,240,706 | Law | May 6, 1941 |
| 2,241,950 | Kuhiger | May 13, 1941 |
| 2,297,048 | Britten | Sept. 29, 1942 |

FOREIGN PATENTS

| Number | Country | Date |
| --- | --- | --- |
| 809,182 | France | Dec. 3, 1936 |